July 28, 1959 R. D. PITTS ET AL 2,896,249
POULTRY PROCESSING EQUIPMENT
Filed May 13, 1957 4 Sheets-Sheet 1

INVENTORS.
ROBERT D. PITTS
FREDERICK C. COREY
BY
*Flournoy Corey*
ATTORNEY.

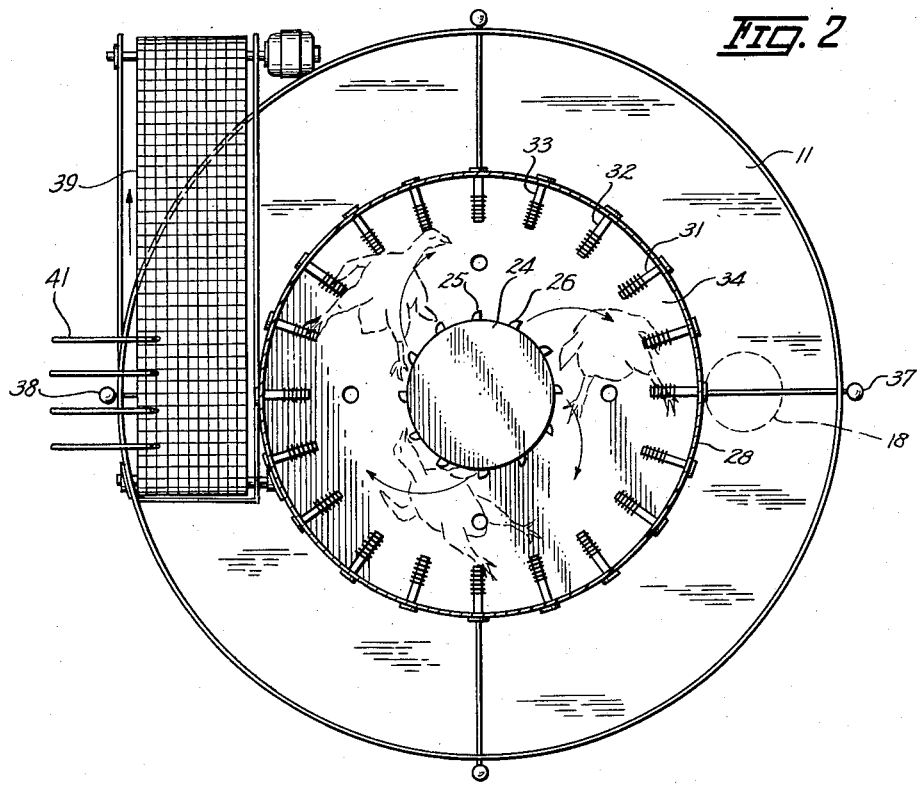
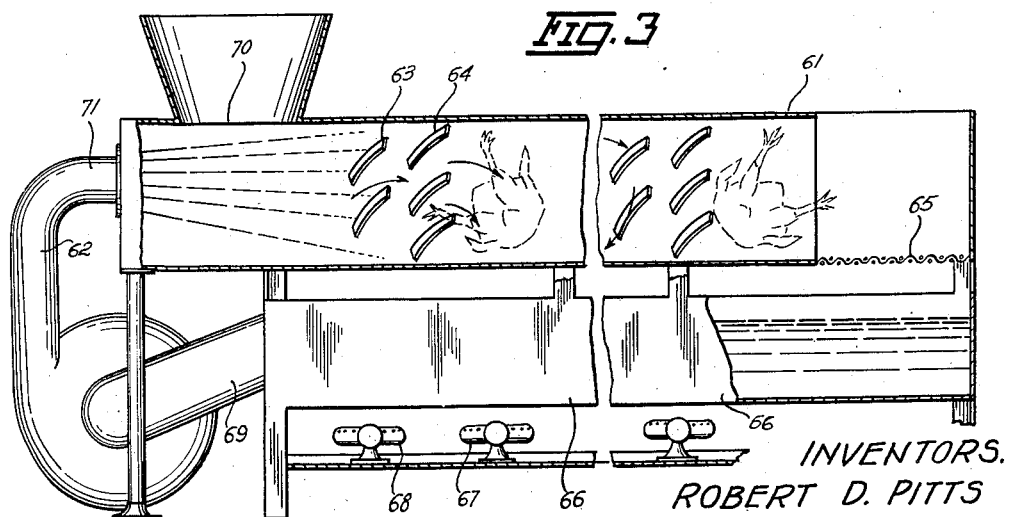

INVENTORS.
ROBERT D. PITTS
FREDERICK C. COREY
BY Flournoy Corey
ATTORNEY.

July 28, 1959 R. D. PITTS ET AL 2,896,249
POULTRY PROCESSING EQUIPMENT
Filed May 13, 1957 4 Sheets-Sheet 4

INVENTORS.
ROBERT D. PITTS
FREDERICK C. COREY
BY Flournoy Corey
ATTORNEY.

United States Patent Office 2,896,249
Patented July 28, 1959

2,896,249

POULTRY PROCESSING EQUIPMENT

Robert Donald Pitts and Frederick C. Corey, Cedar Rapids, Iowa, assignors to Pickwick Company, Cedar Rapids, Iowa, a corporation of Iowa Application May 13, 1957, Serial No. 658,563

2 Claims. (Cl. 17—45)

This invention concerns the apparatus and method of removing the feathers from poultry and the like and more particularly one employing a large volume of heated liquid as the carrier of poultry in a confined area.

At the present time, commercial poultry picking operations generally use a two-stage method of removing feathers from poultry, the first stage being scalding the bird for a period of thirty seconds to two minutes at a predetermined fixed temperature, the most common temperatures being 126 degrees, 138 degrees, 140 degrees and 145 degrees. After the scalding operation, the bird is next subjected to a picking action in a mechanical picker. The picker will include a drum having a number of projecting rubber fingers on it and being revolved at approximately 200 revolutions per minute. The bird is held in contact with these fingers and the drum, either by shackles, by hand, or by sheet metal positioners, or by its own weight.

The scalding operation is necessary in order to loosen the feathers after the bird has been killed. As the bird cools in the picking operation, the feathers become more set and harder to remove. The abrasive action of the mechanical picker must be increased and the opportunities for bruising and barking or cutting the bird increase proportionally to the cooling action of the bird.

It is therefore a primary object of our invention to provide a method of removing feathers from a fowl in which the bird is held at a sufficiently high temperature to keep the feathers loose in the skins of the birds.

It is another object of our invention to provide a method and a device in which a bird is continuously tumbled by a large volume of turbulent water or other liquid within a confined area.

It is still another object of our invention to provide a device and a method wherein the rapidly moving bird is repeatedly brushed by a plurality of resilient feather removing elements.

It is still another object of our invention to provide a device in which the length of time the bird is subject to such rapidly moving turbulent action is fixed by the control of the volume and the extent of movement of the liquid.

It is again another object of our invention to provide a method and a device in which a plurality of birds may be subjected to the feather removing operation in continuous sequence.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims without departing from the spirit of the invention.

In said drawings:

Figure 2 is a top view of the device shown in Figure 1, the central housing being shown in cross section.

Figure 3 is a view, partially in cross section, of another embodiment of our device employing our method and in which poultry is defeathered in a continuous linear flow.

Figure 1:
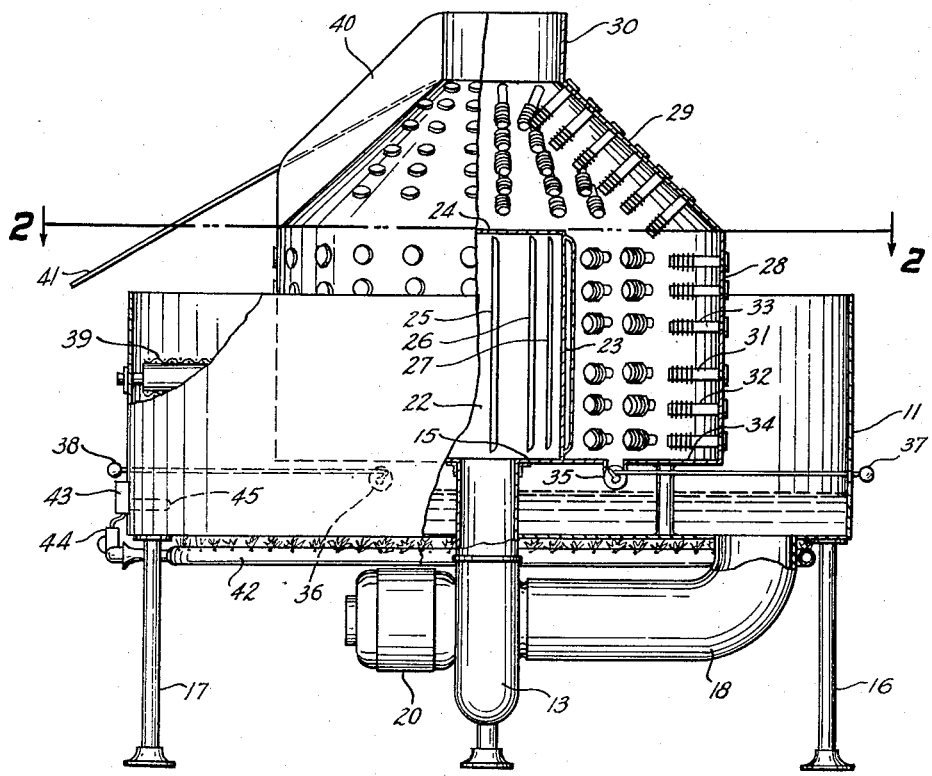
Figure 1 is a view in cross section of a device, constructed according to one embodiment of our invention, which employs the feather removing method hereinafter set forth.

Referring now to the drawings, and particularly to Figure 1; the essential elements of the apparatus shown therein being a water or liquid storage tank 11, a central housing 12 in which the poultry is defeathered, and a centrifugal pump 13 which transfers water from the storage tank to the central housing.

In the device shown in Figure 1, the storage tank is a circular open tank having a sheet metal wall 14 and a bottom 15, this tank being supported on a plurality of legs such as 16 and 17. Leading from the bottom of this tank is a large conduit 18 which is connected to the intake port 19 of the centrifugal pump 13. The pump is driven by an electric 20. The output side of this pump is connected to a vertical conduit 21 which extends upwardly toward the central housing into a distributing chamber 22. This chamber is positioned in the center of the housing and consists of a cylinder having vertical walls 23 and a top portion 24. In the circular walls are a series of vertical louvers such as 25, 26 and 27 through which water, injected into the cylinder, can escape into the interior of the central housing.

In carrying out the method, it is essential that the pump be of sufficient size and capacity to handle a large volume of water in order that it will immediately force quantities of water into the central housing or picking chamber whenever the pump is started. The vertical louvers cause the water to be thrown outwardly from the cylinder in an angular relation to the arc of both the cylinder and the housing. The housing itself is also circular, having a sheet metal wall portion 28 spaced at a substantial distance from and surrounding the cylinder 23. The distributing cylinder 23 extends approximately half the vertical distance of the entire central housing. Above the circular wall 28 is a circular cone 29 which terminates in a small vertical stack 30.

All about the inside of both the wall 28 and the cone portion 29 are a plurality of feather removing elements which, in the embodiment shown, are a series of resilient stubs of rubber such as 31, 32 and 33. In the bottom 34 of the central chamber are a plurality of drain valves such as 35 and 36. These are controlled by outwardly extending rods 37 and 38. Mounted in the storage tank between its outer wall and the outer wall of the central chamber is a power driven conveyor 39. Leading outwardly from the stack 30 towards the conveyor 39 is a chute 40 having a series of bars 41 which lie along the chute and extend over the conveyor to point radially beyond the outer wall of the storage tank.

It is essential that the water or other liquid, circulated through this unit, be held at a predetermined temperature. This temperature would be a temperature such as used by commercial processors in processing poultry, there being several different accepted temperatures which bring about different types of finish in the birds being picked. These temperatures, in general, are 122 to 128 degrees or 138 to 145 degrees.

In order to maintain the desired temperature, a gas burner 42 is positioned below the storage tank and is thermostatically controlled by a conventional thermostat 43 which is connected to a temperature-responsive valve 44 and actuated by a thermostatic bulb 45.

Referring now to Figure 2 as well as to Figure 1, we will describe the operation of the devices shown therein and the method employed thereby. Water is contained in the storage tank and heated to the desired temperature as heretofore described. When the pump 16 is energized, water is drawn through the conduit 18 from the storage tank and forced upwardly into the central distributing cylinder 23 within a central operating chamber. Poultry has been previously lowered into this chamber through the stack opening 30. A number of birds are introduced into the operative area at one time, the exact number depending upon the size of the chamber itself.

As the water is ejected through the cylinder into the chamber, it begins to rise in a state of great turbulence by reason of the force of the pump and by reason of the angular nature of the louvers. However the general direction of flow as shown in Figure 2 is clockwise. The volume of the water introduced is sufficient that it moves, tumbles, and washes the bird clockwise within the central chamber. As the birds are moved, they are thrown into contact with the feather removing elements, such as 31, 32 and 33, both by turbulence and by centrifugal force. Since the temperature of the water is within normal scalding range, the feathers are loosened in their sockets as the bird is tumbled. Further, the skin area is thoroughly saturated and the feathers begin to come out.

The valves such as 35 and 36 can be adjusted to either permit the water being injected into the central chamber to drain back into the storage tank, or can be set to cause the water to rise to a higher and higher level within the central chamber.

It is obvious that as the water rises, the birds are floated in an upwardly direction. The water finally reaches the stack 30 and begins to overflow outwardly and downwardly through the chute 40. It will be apparent that the floating birds will also be carried through the stack and down the chute. The water returns to the storage tank on the outside of the central chamber passing through the conveyor 39. The conveyor is formed of an open, woven cloth which permits the passage of water but will catch the loose feathers which are carried by the water. The birds are separated from the flow of liquid by the angular rods 41, as set forth heretofore, and delivered to a point outside of the machine.

The time that the birds are held in the central chamber will be determined by the amount of water held therein through the manipulation of the drain valves 35 and 36, and thus the birds may be held until they have moved through the turbulent liquid a sufficient length of time to completely remove the feathers.

Another embodiment of our invention employing the method herein described is shown in Figure 3. In this instance the central defeathering chamber is a horizontal tube 61 which may be of any desired length. The water is moved along the length of this tube by the pressure of a centrifugal pump such as 62.

The tube should be of such diameter as to conveniently accommodate the larger birds and permit them to tumble freely. Along the inner wall are a series of feather removing elements, shown in this embodiment as angular flaps such as 63 and 64 which are positioned in groups. The angle of the flaps is varied from one group to another in order to create varying degrees of turbulence by disturbing the even flow of the water. It is to be understood that in operation this tube is substantially full of water. The birds, as they are carried down the length of the tube, are brought into contact with the individual groups of flaps, these flaps being adapted to rub the bird and cause the feathers to be extracted. The tube has portions which are clear of any obstruction, and it is in these areas that the turbulence of the water acts upon the birds to turn them and tumble them in order to expose different surfaces to the next succeeding group of feather removing elements. The birds are finally ejected at the open end of the tube on an open grillwork 65. Along the length of the tube and underneath it is a continuous storage tank 66 which is heated by a series of burners such as 67 and 68. The liquid is withdrawn from this storage tank to the pump by a conduit 69. The poultry is introduced into the tubular defeathering section conduit through an opening 70 adjacent the discharge 71 which is connected to the pump.

It will be at once apparent that the length of this tube can be varied in manufacture to correspond to the type of the poultry being defeathered and the degree of dressing desired. The longer the tube, the longer the poultry will be subjected to the turbulent movement in the stream of hot water and the more feather removing elements, such as 63 and 64, will be encountered. Again the method of defeathering comprises using a large volume of turbulent water to tumble and roll the birds against feather removing elements in a confined space. It will be apparent that both the movement of the water and the contact of the feather removing elements will cause feathers to be pulled from the bird.

Figure 4:
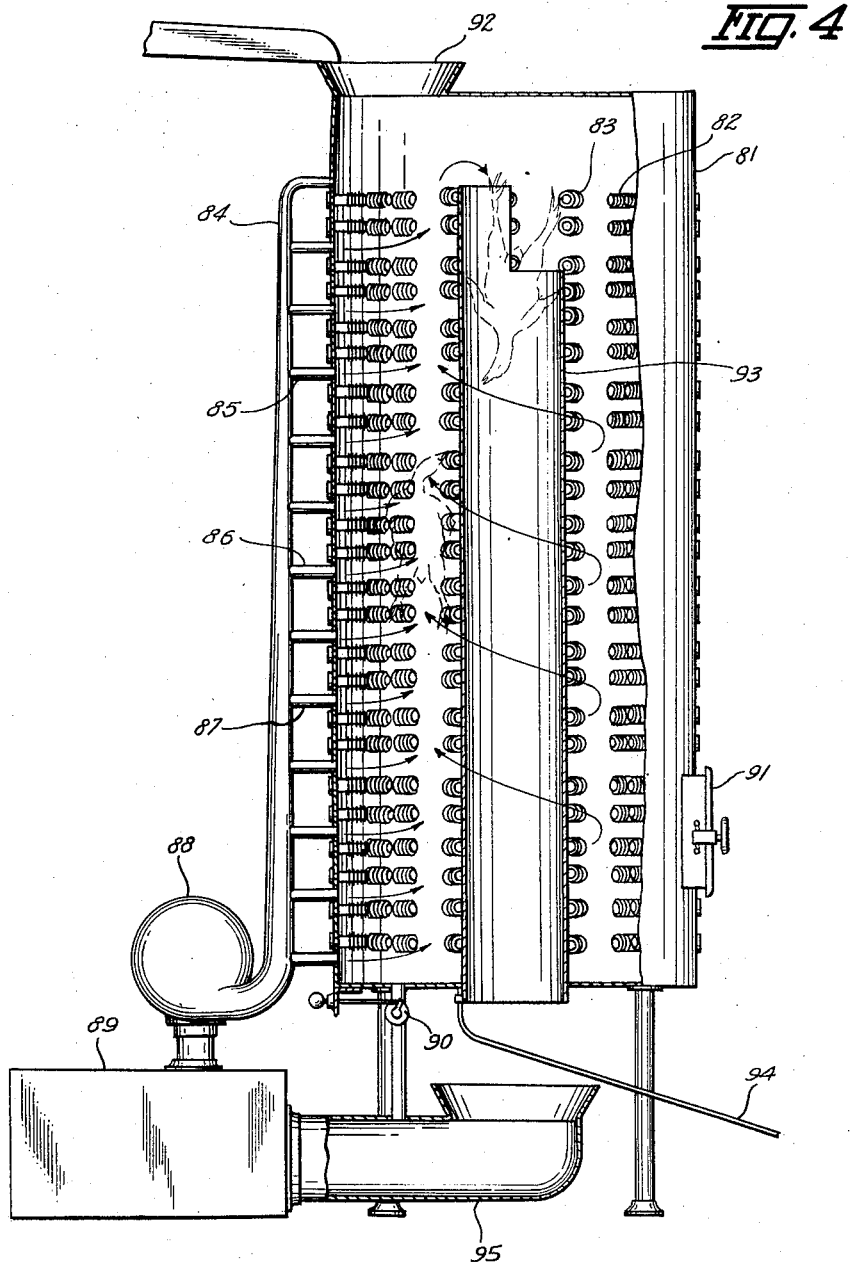
Figure 4 is yet another embodiment of our invention in which the direction of flow of the poultry and liquids is in a vertical direction of substantial length with a center discharge column.

In Figure 4 the device shown is similar to that of Figures 1 and 2 except that the central defeathering chamber 81 is of substantial vertical height. It too has a plurality of feathered removing elements 82 and 83 about the inner wall. Along one side is a vertical conduit 84 which has a series of inwardly projecting jets 85, 86 and 87 which permit streams of water to be shot into the interior of the defeathering chamber. The pressure for these streams of water is provided by a centrifugal pump 88.

The water again is heated, the water being generally contained in a remote storage tank 89, and heat being provided in any common commercially accepted manner. A bottom valve 90 is provided to permit water to be drained out of the central chamber 81 and transferred to the storage tank 89. This valve may be closed at will in order that the vertical tank will fill as water is injected into it through the jets 85, 86 and 87.

Birds are introduced into the machine either through a door 91, or through a top opening 92. Again the water is introduced into the machine in great volume and in a manner whereby it will be in extreme turbulence, but generally the direction of movement is clockwise. Birds carried by the water will thereby be moved in a clockwise direction and thrown against the feather removing elements. As the tank gradually fills with the water, the birds are floated in any upwardly direction. As the birds and the water reach the top of the central defeathering chamber, the level thereof becomes equal to the uppermost extent of the central drain pipe 93. This drain pipe serves as an overflow pipe, and as the birds, feathers and water move into it, the birds are dropped in a downwardly direction until they reach a series of extracting guides or rods 94 which bring the birds out of the machine in a sideward direction from the overflow pipe. The water continues downwardly and returns to the storage tank through a large conduit 95.

In the device shown in Figure 4, the water which is circulated in the central chamber is constantly heated and reused, being drained into the remote storage tank 89 through the conduit 95 and withdrawn by the pump 88.

Figure 5:
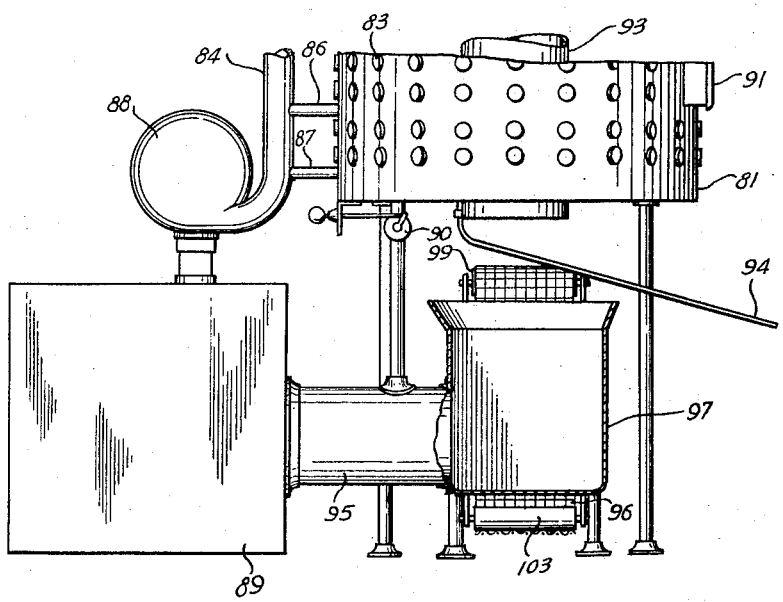
Figure 5 is a side view of the lower portion of the device shown in Figure 4, showing the drain portion thereof.
Figure 6:
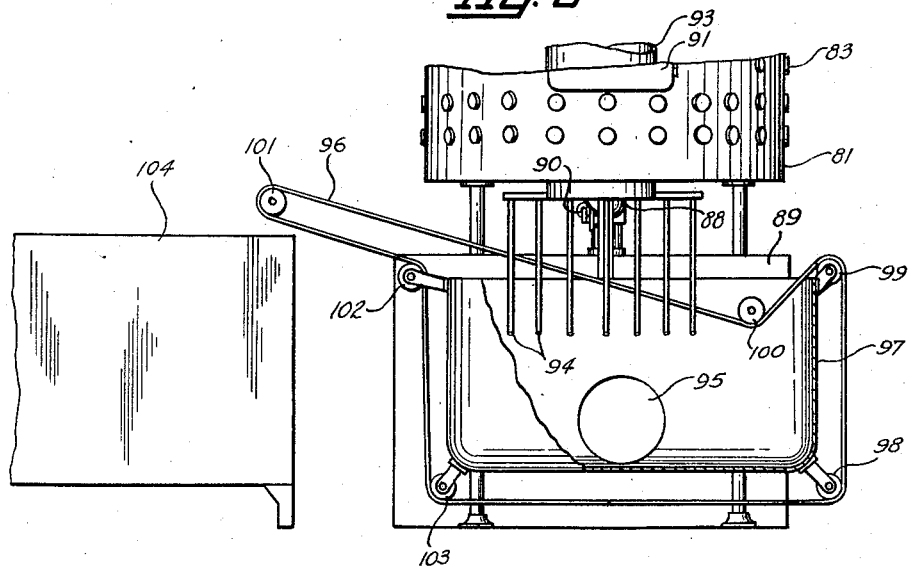
Figure 6 is a view in section taken at A—A of Figure 5 to show the means of separating feathers from the discharge water.

Since the water is to be reused, it is necessary to extract the feathers from this water before it is returned to the storage tank. To accomplish this, we have provided a feather conveyor 96, as shown in Figures 5 and 6. As previously set forth, the bars or grill 94 deflect the picked birds out of the stream of moving water. The water then drops into a small tank or a catch basin 97. The endless conveyor 96 is of flexible wire or cloth mesh.

A series of mounting pulleys, such as 98, 99, 100, 101, 102 and 103, serve to carry this endless conveyor down through the catch basin and upward at an angle towards the pulley 181 where the accumulated feathers are dumped into a waste vat 104. The conveyor then turns back past pulleys 102, 103, and 98 and again into the catch basin, always coming directly under the flow of water from the discharge column 93. Once the feathers have been removed from the water, this water goes through the discharge conduit 95 into the central storage tank 89.

Again it will be apparent that warm water in large quantities is employed as a carrier to circulate poultry through a defeathering chamber where the birds were tumbled and revolved and kept at above body temperature and brought into contact with feather removing elements. As heretofore set forth, the combination of a scalding and picking operation holds the bird at a high temperature such that the feathers will be easily removed.

It will be apparent that the utilization of a large volume of turbulent hot water within a confined area not only holds the temperature of the bird at a high level, causing the relaxation of the root pockets, but also increases the degree of penetration of the water and the heat it carries. The water also acts as a lubricant to prevent the bruising and barking or injury of the bird by the feather removing elements. The rapid movement of the bird in all directions causes all surfaces to be exposed to picking action of both the water and the feather removing elements. Experimentation has proved that birds dressed in the presence of a large volume of hot water at comparatively low temperatures, such as 122 degrees, will retain the outer skin or "bloom" intact and will have a high yellow color. It is a well known fact that a bird with this outer skin or "bloom" still intact is less subject to deterioration and will keep its saleable appearance and freshness longer.

It should also be apparent that the various stages of the method used in connection with the devices shown in Figures 1, 2 and 4 may be varied or timed to secure the best results with various types and sizes of birds. For example, it may be desirable to subject the birds to less turbulence during a preliminary scalding period. This may be accomplished by operating the pump at a relatively low speed and closing or partially closing some of the valves, 35 and 6 in Figure 1, or valves 90 in Figure 4.

The birds being processed may be subject to maximum turbulence and defeathering action for any length of time desired by proper adjustment and control of the flow of water into and out of the defeathering chamber. It should also be obvious that these various stages may be controlled automatically by the application of the proper motorized valves, switches and timers to control the speed of the pump and the operation of the valves.

Although we have described several exemplary embodiments of our invention, it is apparent that modifications thereof may be made by those skilled in the art. Such modifications may be made without departing from the spirit and scope of our invention as set forth in the appended claims.

We claim as our invention:

1. The method of defeathering poultry comprising immersing said poultry in a large volume of heated liquid, moving said liquid and said poultry directionally in a turbulent state and causing said poultry to be floated and tumbled freely in said liquid, and subjecting said poultry to a stationary scraping action removing the feathers therefrom during the movement thereof.

2. The method of processing poultry and comprising immersing the poultry in a heated liquid, causing the liquid and said poultry to be moved in a generally circumferential path and causing said poultry to be floated and tumbled about freely therein and to be thrown outwardly therein by centrifugal force, and subjecting said poultry to a stationary rubbing or scraping action removing the feathers therefrom during the movement thereof.

References Cited in the file of this patent

UNITED STATES PATENTS

| | | |
|---|---|---|
| 2,389,404 | Barker | Nov. 20, 1945 |
| 2,754,539 | Toti | July 17, 1956 |
| 2,777,158 | Pitts et al. | Jan. 15, 1957 |
| 2,777,159 | Pitts et al. | Jan. 15, 1957 |
| 2,790,199 | Zebarth | Apr. 30, 1957 |
| 2,805,443 | Toti | Sept. 10, 1957 |
| 2,813,298 | Barker et al. | Nov. 19, 1957 |